United States Patent
Bascle et al.

(10) Patent No.: US 7,139,685 B2
(45) Date of Patent: Nov. 21, 2006

(54) VIDEO-SUPPORTED PLANNING OF EQUIPMENT INSTALLATION AND/OR ROOM DESIGN

(75) Inventors: Benedicte Bascle, Plainsboro, NJ (US); Thomas Ruge, Munich (DE); Artur Raczynski, Munich (DE)

(73) Assignees: Siemens Aktiengesellschaft, Munich (DE); Siemens Corporate Research, Inc., Princeton, NJ (US)

( * ) Notice: Subject to any disclaimer, the term of this patent is extended or adjusted under 35 U.S.C. 154(b) by 683 days.

(21) Appl. No.: 10/002,737

(22) Filed: Nov. 2, 2001

(65) Prior Publication Data

US 2002/0107674 A1   Aug. 8, 2002

Related U.S. Application Data

(60) Provisional application No. 60/245,149, filed on Nov. 3, 2000.

(51) Int. Cl.
  *G06F 17/50*   (2006.01)
(52) U.S. Cl. .................... 703/1; 345/661; 345/664; 715/850
(58) Field of Classification Search ............. 345/418, 345/419, 420, 619, 632, 633, 652, 653, 655, 345/660, 664, 666, 670, 661; 382/106, 287, 382/291; 700/97, 98; 703/1, 6, 7; 715/764, 715/778, 771, 848–850; 434/79, 80
See application file for complete search history.

(56) References Cited

U.S. PATENT DOCUMENTS 3,603,004 A * 9/1971 Fink .......................... 434/73
4,017,986 A * 4/1977 Miller ....................... 434/73
5,590,062 A * 12/1996 Nagamitsu et al. .......... 703/6
5,975,908 A * 11/1999 Hulten ....................... 434/72
6,078,329 A * 6/2000 Umeki et al. ............... 345/419
6,097,393 A * 8/2000 Prouty et al. ............... 345/419

(Continued)

FOREIGN PATENT DOCUMENTS

WO   WO 98/13745   4/1998

OTHER PUBLICATIONS

Wood, Ernest J., "An Object-Oriented SECS Programming Environment", IEEE Transactions on Semiconductor Manufacturing, 1993.*

(Continued)

*Primary Examiner*—Albert W. Paladini
(74) *Attorney, Agent, or Firm*—Donald B. Paschburg; F. Chau & Associates, LLC (57) ABSTRACT

Disclosed is a room planning and design system, comprising a virtual room space comprising a virtual representation of a physical room space, an object library of virtual objects, said virtual objects comprising virtual representations of equipment, machines and objects that may be placed in a room, a user interface comprising a first user interface component for selecting said virtual objects from said virtual library and positioning them in said virtual room space, a second user interface component for manipulating the positions and orientations of said virtual objects within said virtual room space, a workspace comprising a physical model of said physical room space, physical marker objects substantially scaled to said workspace for manual placement and orientation of said markers objects in said workspace, one or more detectors for detecting information regarding the positioning of said marker objects in said workspace and transmitting said information to a visualization module, and said visualization module adapted to receive said information from said detectors and utilize said information for positioning said virtual objects within said virtual room space.

16 Claims, 5 Drawing Sheets

U.S. PATENT DOCUMENTS

| | | | | |
|---|---|---|---|---|
| 6,384,823 B1* | 5/2002 | Donoghue | ................... | 715/848 |
| 6,470,301 B1* | 10/2002 | Barral | ........................... | 703/1 |
| 6,594,623 B1* | 7/2003 | Wang et al. | .................... | 703/1 |
| 6,741,245 B1* | 5/2004 | Marks et al. | ................ | 345/420 |
| 6,912,489 B1* | 6/2005 | Luitwieler | ..................... | 703/1 |
| 2002/0032546 A1* | 3/2002 | Imamura et al. | ................ | 703/1 |
| 2002/0065635 A1* | 5/2002 | Lei et al. | ........................ | 703/1 |
| 2002/0123812 A1* | 9/2002 | Jayaram et al. | ................ | 700/98 |

OTHER PUBLICATIONS

Pomorski, Tom, "Managing Overall Equipment Effectiveness to Optimize Factory Performance", IEEE, 1997.*

Yuan et al., "Mechanical assembly with data glove device", IEEE, 1997.*

Fersha, Alois, "Workspace Awareness in mobile virtual teams", IEEE, 2000.*

E. Freund et al.; "Distributing 3D Manufacturing Simulations to realize the digital plant", Proceedings of the 2003 IEEE International Conference on Robotics & Automation, 2003.*

Jayaram, Sankar et al., "Virtual assembly using virtual reality techniques", Computer-Aided Design, 1997.*

Fernando, Terrance et al., "Software architecture for a constraint-based virtual environment", ACM, 1999.*

T. Kesavadas et al., "Interactive Virtual Factory for Shop Floor Design using Cellular Manufacturing Concepts", Department of Mechanical and Aerospace Engineering, 1999.*

The CADD GIS technology center, "Spatial data standards/facility management standards release 2.00", 2000.*

Technical Profile, "PlantSpace P&ID", MicroStation Schematics Engineering Configuration, 2001.*

Rauterberg M et al. "A gesture based interaction technique for a planning tool for construction and design," *Robot and Human Communication* 1997.

Behringer R. et al. "A Novel Interace for Device Diagnostics Using Speech Recognition, Augmented Reality Visualization, and 3D Audio Auralization," *Multimedia Computing And Systems*, 1999.

Fitzmaurice G. W. et al. " Bricks: Laying the Foundations for Graspable User Interfaces," *Human Factors In Computing Systems* 1995.

Coomans M.D. D. et al. "A VR-User Interface for Design by Features," *4th Conference on Design and Decision Support Systems in Architecture and Urban Planning* 1998.

Newman W et al. "A Desk Supporting Computer-Based Interaction With Paper Documents," *Striking A Balance*, 1992.

Bruns F. W., "Integrated Real and Virtual Prototyping," *Industrial Electronics Society* 1998 .

International Search Report 1998.

* cited by examiner

Figure 4d

VIDEO-SUPPORTED PLANNING OF EQUIPMENT INSTALLATION AND/OR ROOM DESIGN

CROSS-REFERENCE TO RELATED APPLICATIONS

This patent application is based upon, and claims the benefit of, Provisional U.S. Patent No. 60/245,149, entitled VIDEO-SUPPORTED VIRTUAL PLANT DESIGN (VPA), filed Nov. 3, 2000, the disclosures of which are incorporated by reference herein in their entirety.

FIELD OF THE INVENTION

This invention relates to computer-assisted installation of equipment in rooms.

BACKGROUND OF THE INVENTION

Buyers and/or suppliers of equipment need to plan where to put said equipment in their existing/new/in-planning facilities. For instance, during the construction of manufacturing plants, and after the civil construction of the plant building is already completed, the design engineer plans the positioning of the many components of the factory (manufacturing machines, storage areas, . . . ), within the physical constraints imposed by the completed structure. Another example is the installation of MRI (magnetic resonance imaging) machines in hospital rooms. In this case, the manufacturer needs to plan the way to get the machine into the right room on the right floor (the basement for instance) and to plan where to place the machine in the room. The problem is constrained by the fact that a MRI machine produces a strong magnetic field and that no metallic equipment should be within its reach. A third example would be maintenance and repair work in electricity-generating plants (gas plants, etc. . . . ). Maintenance equipment needs to be brought in (temporarily). Equipment that has to be replaced needs to be brought out. The replacing equipment needs to be brought in. All this equipment movement has to be planned. Planners need to check that there is enough room to move said equipment as planned.

SUMMARY OF THE INVENTION

Disclosed is a room planning and design system, comprising a virtual room space comprising a virtual representation of a physical room space, an object library of virtual objects, said virtual objects comprising virtual representations of equipment, machines and objects that may be placed in a room, a user interface comprising a first user interface component for selecting said virtual objects from said virtual library and positioning them in said virtual room space, a second user interface component for manipulating the positions and orientations of said virtual objects within said virtual room space, a workspace comprising a physical model of said physical room space, physical marker objects substantially scaled to said workspace for manual placement and orientation of said markers objects in said workspace, one or more detectors for detecting information regarding the positioning of said marker objects in said workspace and transmitting said information to a visualization module, and said visualization module adapted to receive said information from said detectors and utilize said information for positioning said virtual objects within said virtual room space.

In another aspect of the system, said detected information comprises the positioning of said marker objects comprises both the placement and orientation of said marker objects, and said visualization model utilizes said information to both place and orient said virtual objects within said virtual room space.

In another aspect of the system, said physical room space is a factory plant.

In another aspect of the system, said physical room space is a medical facility.

In another aspect of the system, at least one of said virtual objects is an MRI machine.

In another aspect of the system, said object library of virtual objects comprises data stored in a computer-readable media.

In another aspect of the system, each said virtual object further comprises data regarding the motion of said virtual object, useable by the user to animate said virtual object on said visual display.

Another aspect of the system further comprises a third user interface component for permitting the user to virtually move about said virtual room space.

In another aspect of the system, said workspace is a table.

In another aspect of the system, said detector comprises at least one camera.

In another aspect of the system, said marker objects further comprise markings thereon that yield identification information to said detector.

In another aspect of the system, said marker objects further comprise markings thereon that yield orientation information to said detector.

Disclosed is a method of room planning and design, comprising obtaining a virtual room space comprising a virtual representation of a physical room space, loading an object library comprising virtual objects, selecting an virtual object, receiving positioning information from a user through a workspace comprising a physical model of said physical room space, positioning said virtual object in said virtual room space in accordance with said positioning information, and wherein said receiving of positioning information from a workspace comprises receiving from a detector the positioning of marker object manually positioned within said workspace by the user.

Another aspect of the system further comprises the step of selecting an active working plane for said positioning of said virtual object.

Disclosed is a program storage device, readable by machine, tangible embodying a program of instructions executable by the machine to perform method steps for room planning and design, said method steps comprising obtaining a virtual room space comprising a virtual representation of a physical room space, loading an object library comprising virtual objects, selecting an virtual object, receiving positioning information from a user through a workspace comprising a physical model of said physical room space, positioning said virtual object in said virtual room space in accordance with said positioning information, and wherein said receiving of positioning information from a workspace comprises receiving from a detector the positioning of marker object manually positioned within said workspace by the user.

Another aspect of the system further comprises the step of selecting an active working plane for said positioning of said virtual object.

DETAILED DESCRIPTION OF PREFERRED EMBODIMENTS

Figure 1:
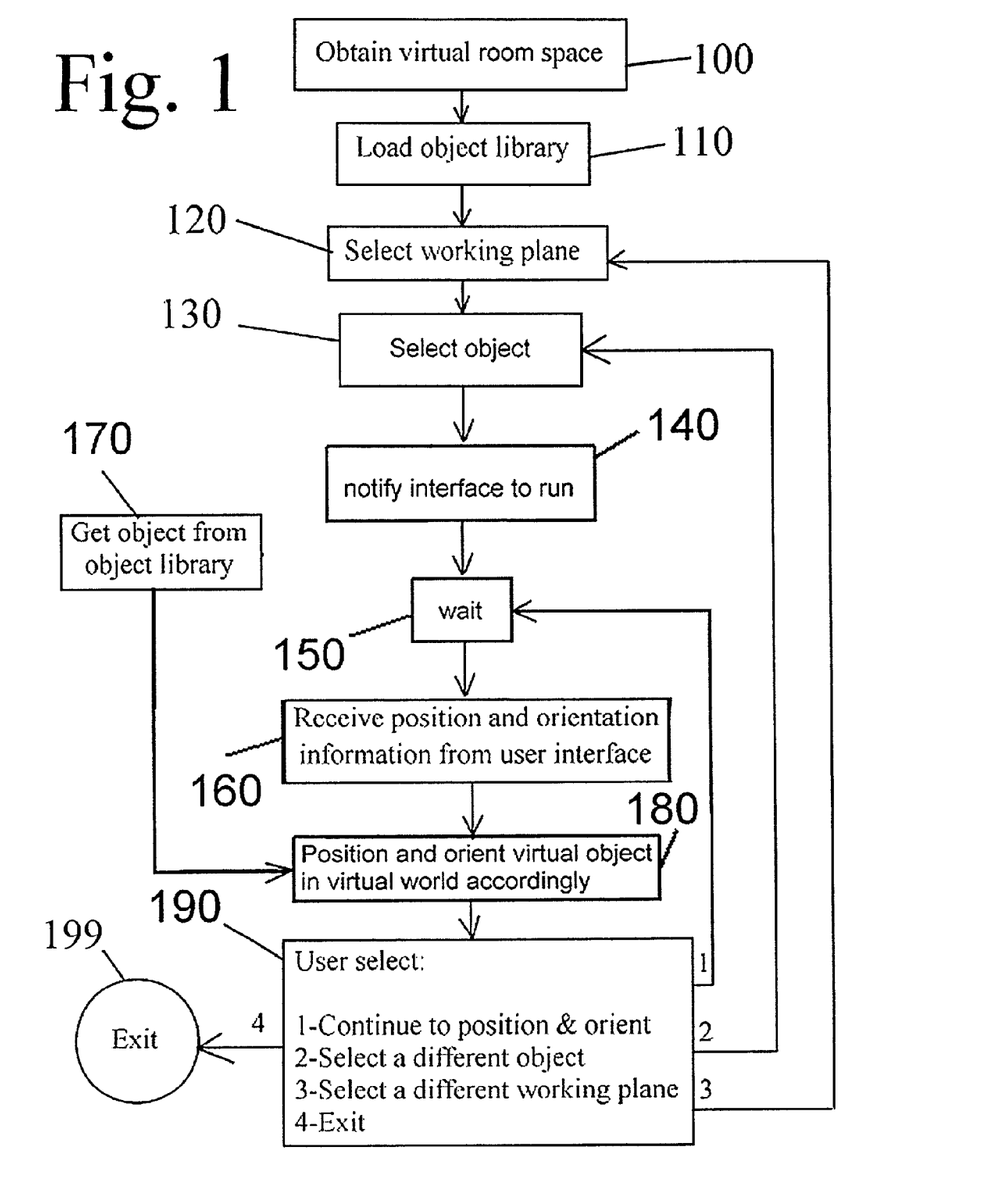
FIG. 1 shows a flowchart of an embodiment of the invention.
Figure 2:
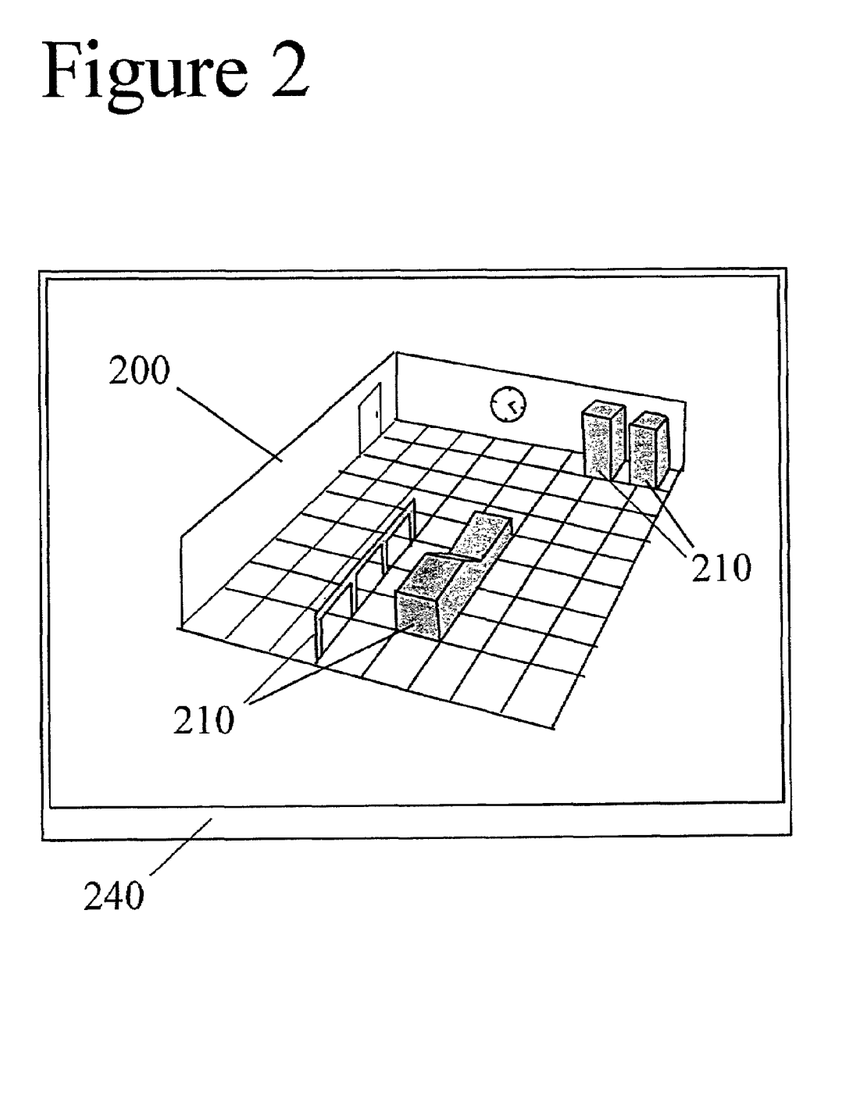
FIG. 2 shows a display of a virtual room space containing virtual objects (pieces of equipment).

Referring to FIGS. 1 and 2, there is shown a flowchart of a preferred embodiment of the invention, which begins with preferably a 3D virtual representation of the physical room, though the methods of this invention may be applied to simple 2D floor plan representations. When starting up, the current state of the physical room or of the room design is displayed on a display device, generally a computer monitor. A typical display is shown in FIG. 2. This might include walls, steel construction, etc. The user of the system might be a design engineer, a plant designer, a maintenance planner, a room planner, a planner of the installation of new equipment in a room, etc. The user needs to add various virtual objects (for instance pieces of equipment) to the virtual representation of the room space until the room (new or updated) design is complete. Several users can also use the system simultaneously. Our system is a collaborative user interface that helps the user(s) better visualize different possible designs and optimally position each of the room objects, thereby aiding room design. The system will preferably permit the user to virtually move around the plant, to get information about each virtual object in the virtual room 210, to manipulate said objects and to control 3D animations. When the designer has placed all the room components, he can export the positions, orientations and scaling of the complete model to a CAD-system. The complete design can also visualized in 3D using Virtual Reality or Augmented Reality techniques. Virtual objects can also be visualized in real images of the physical room.

A preferred process flow of the invention, which will be executed on a computer or equivalent processing device, begins with obtaining the virtual plant or room space 100, which may be inputted through known electronic or computer means as a collection of coordinate points or 3D model files (VRML or CAD) or other useful formats known to the literature. Next, an object library is loaded 110 and a working plane selected 120. The working plane determines the vertical height at which objects will be inserted into the virtual room space.

The object library contains the virtual objects (for instance pieces of equipment) that may be placed in the virtual room space. It may be a collection of custom objects for the job at hand or a collection of generic stock objects for general use. The user selects 130 the object he now wishes to work on. The system puts itself into position input mode 140. It waits for input from the user 150. Positioning information is received 160 from the user. Positioning information may only comprise placement (i.e., location) information, but in a preferred embodiment will also comprise orientation information. The 3D model of the object is recovered from the library 170 by a first user interface component. Then the virtual object is positioned 180 into the virtual world according to the information gathered in 160. Alternatively, the system may select a default position and then allow the user to manipulate the placement of the object.

Node 190 is a selection box wherein the user may continue to move around the object through another user interface component until he is satisfied with it's positioning, or he may select a different object and begin moving it around. He may also choose to move to a different working plane or simply exit to node 199. The choice by default could be to continue positioning without querying the user until the user gives a specific input (keyboard input, mouse click, menu choice, etc. . . . ) that indicates that he/she is done with positioning.

Figure 3A:
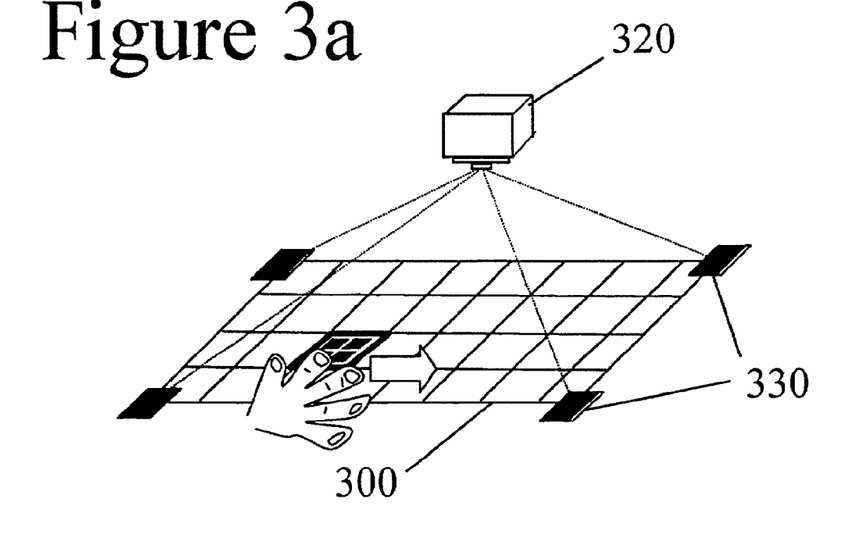
FIGS. 3a and 3b show a physical model of the room space.
Figure 3B:
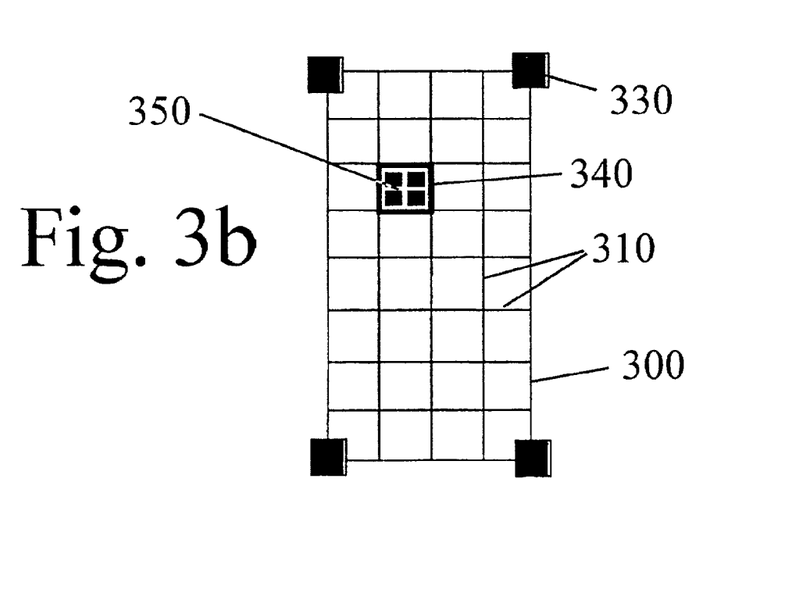

FIGS. 3a and 3b show the preferred input device of the invention. A surface 300 is provided that acts as a physical model of the layout of the room space. This surface may be as complex and detailed or as simple as desired. It could simply be a flat table surface, possibly with a visible grid coordinate system 310 and perhaps either an overlay of the floor plan of the room, or a projection thereof (not shown). A detector 320 is provided, such as a video camera or other detection means that may collect information on the positioning (i.e., placement and/or orientation) of physical objects placed on the table 300. Markers 330 may be placed at the corners or other places of the workspace to delineate the space. This would aid the system in mapping the physical workspace above surface 300 to the virtual room space. Objects known to the system (flat 2D markers, 3D objects with or without markers, props, etc. . . . ) 340 may then be manually placed and moved about or above the surface of the workspace 300 and detected by the detector 320. These "marker objects" being moved in the workspace 340 will preferably have markings or other identifiers on them to allow the detector to determine certain information, such as orientation and identity. Hence, a cross might be set up to represent a drill press, a circle a lathe, and so forth. Alternatively, the marker objects can have such distinctive shapes that they can be easily differentiated by the system without the need for added markings or identifiers for that purpose.

When the user moves these 2D markers or 3D markers or 3D objects 340 on the surface 300, detector 320 perceives it. For example, using a camera detector, the system may use known image processing techniques to determine from the camera images the positioning of the markers on or above the desk at regular time intervals. This information is then sent to a visualization module of the system, which uses this information to move and animate the different components of the room represented by the marker objects. This gives the designer an easy-to-use intuitive way to interact with the virtual room space. By moving marker objects on the desk and associating these objects with components of the 3D room model, the designer can easily test different positions of an object in the 3D room model. In the same way, the designer can also define possible motions, animations, and trajectories for mobile objects (for instance, forklifts). One further advantage of such an interface is that it is collaborative: several people can discuss the positioning of equipment in a room (for instance machines in a factory or equipment in a hospital) and jointly interact with the 3D model through the interface provided by this system.

In this set-up, we can use marker objects made out of any material (wood, paper, plastic). The objects can have a variety of shape and markings, as long as they are known to the system and the system can differentiate between them. We can use a standard camera that takes images in the visible spectrum or, alternatively, we can use a camera equipped with a ring of infrared-emitting diodes and a filter that allows only infrared light in. With such a camera, markings made out of retro-reflective material need to be pasted onto the marker objects to differentiate them. The system could also use several cameras simultaneously (cameras observing the workspace from different angles)

Figure 4A:
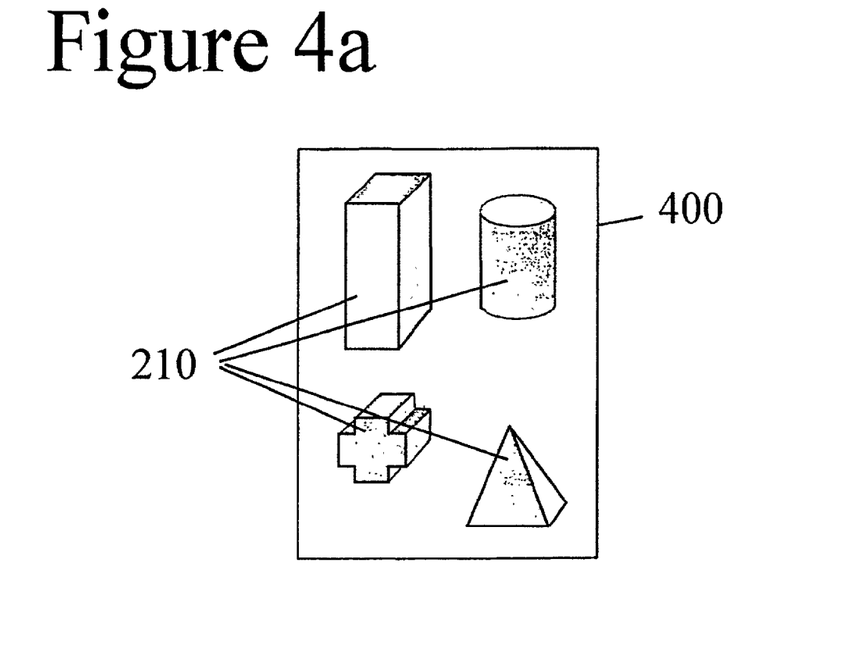
FIGS. 4a through 4d shows the building up of a virtual room space with virtual equipment.
Figure 4B:
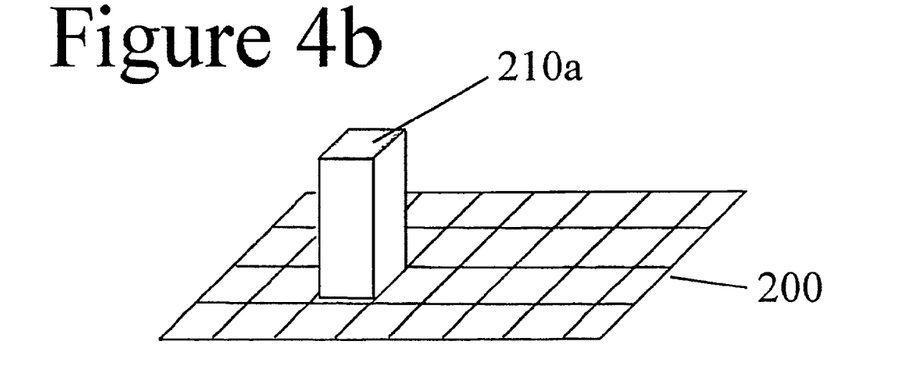
Figure 4C:
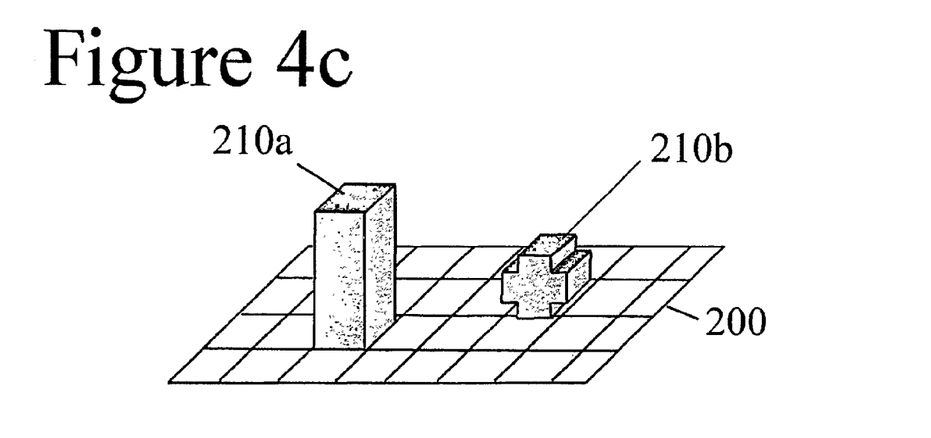
Figure 4D:
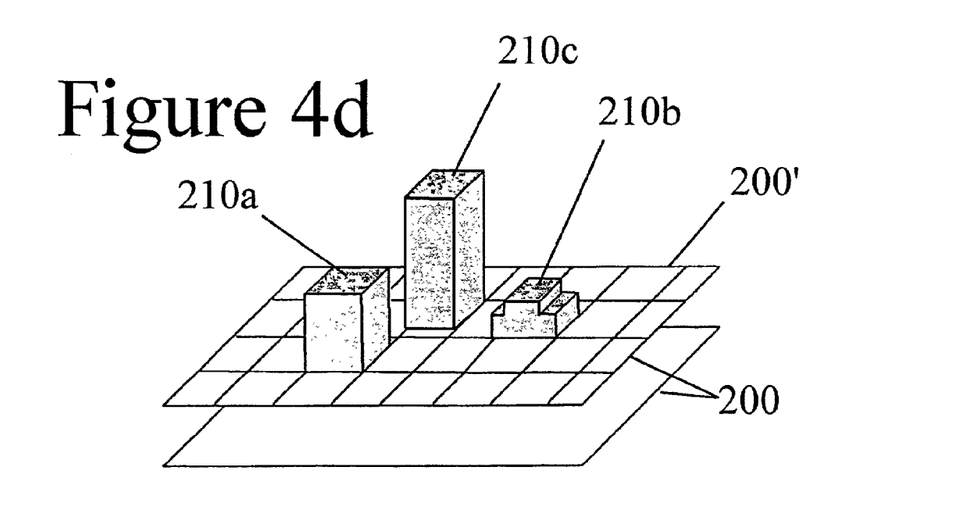

Referring to FIGS. 4a through 4d, there is shown the building up of a virtual room space through the manipulations of real objects on a table by the user. In FIG. 4a a virtual object is chosen and recovered from the virtual library (400), either by direct input by the user or by image processing identification of markings on a marker object on the table. The positioning of the marker object in the physical workspace is detected and used to position the first chosen virtual object 210a into the virtual room space. In FIG. 4c we see a second virtual object 210b added to the virtual room space 200, according to the positioning of another real-world marker object on the table (or any other surface or space that defines the physical workspace). Any of these virtual objects may also rotate in the next detector interval if the user has changed the orientation of the corresponding physical object.

Referring to FIG. 4c, we see how a third virtual object 210c may be positioned on a different level. Even thought the real-world surface may be of only one height, the user may direct the system to change the height of the active plane 200' so that the active plane 200' is now displaced from the original active plane. The third chosen marker object will be the same physical height as the other objects on the table, but in the virtual world, it can be seen that the corresponding third virtual object 210c is at a different level than the other objects. This can be seen on the display by the user as he manipulates the objects on the table.

As can be seen, the invention provides an easy-to-use tool for planning the installation of equipment and/or the design of a room. It can be used collaboratively by several people simultaneously. It can also be used in a distributed set-up, between users having a teleconference from different sites. A physical workspace (a tabletop for instance) is associated to the virtual space of the room that is being planned. A 3D visualization tool shows the virtual layout of the room. The physical workspace is equipped with detectors. Real physical objects are used to embody virtual objects in the physical workspace. By moving these physical objects in the workspace, the user can move the virtual objects in the virtual room. Thus the movements and installations of objects in rooms can be planned in an easy and quick way.

The 3D visualization part of our system incorporates all the object positioning functionality discussed so far, but preferably also a user inter component enabling the user to virtually move about in the virtual world as it is created, manipulating and animating the virtual objects therein.

A preferred embodiment of the system of the invention will therefore utilize a camera system and a 3D visualization tool (a "3D browser") and will provide the following functionality:

Selection of the working plane in the 3D browser
Calibration of the working plane to a planar surface observed by the camera(s) (using a homography)
Selection of the virtual objects/assignment of real-wold marker objects to 3D virtual objects
Translation and rotation of virtual objects by moving the corresponding marker objects in the workspace observed by the camera(s)
Calibration of the camera(s) using calibration patterns (optional)
Navigation through a menu associated with each 3D virtual object
Switch between relative and absolute 3D coordinates
Export of object coordinates and scale to other systems (VRML-based, CAD-based, etc. . . . )

The methods of the invention may be implemented as a program of instructions, readable and executable by machine such as a computer, and tangibly embodied and stored upon a machine-readable medium such as a computer memory device.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A room planning and design system, comprising:
a virtual room space comprising a virtual representation of a physical room space;
an object library of virtual objects, said virtual objects comprising virtual representations of equipment, machines, and objects that may be placed in a room;
a user interface comprising:
a first user interface component for selecting said virtual objects from said virtual library and positioning them in said virtual room space;
a second user interface component for manipulating the positions and orientations of said virtual objects within said virtual room space;
a workspace comprising a physical model of said physical room space;
physical marker objects substantially scaled to said workspace for manual placement and orientation of said markers objects in said workspace;
one or more detectors for detecting information regarding the positioning of said marker objects in said workspace and transmitting said information to a visualization module; and
said visualization module adapted to receive said information from said detectors and utilize said information for positioning said virtual objects within said virtual room space.

2. The system of claim 1 wherein:
said detected information comprises the positioning of said marker objects comprises both the placement and orientation of said marker objects; and
said visualization model utilizes said information to both place and orient said virtual objects within said virtual room space.

3. The system of claim 1 wherein said physical room space is a factory plant.

4. The system of claim 1 wherein said physical room space is a medical facility.

5. The system of claim 4 wherein at least one of said virtual objects is an MRI machine.

6. The invention of claim 1 wherein said object library of virtual objects comprises data stored in a computer-readable media.

7. The invention of claim 6 wherein each said virtual object further comprises data regarding the motion of said virtual object, useable by the user to animate said virtual object on said visual display.

8. The system of claim 1 further comprising a third user interface component for permitting the user to virtually move about said virtual room space.

9. The system of claim 1 wherein said workspace is a table.

10. The system of claim 1 wherein said detector comprises at least one camera.

11. The system of claim 1 wherein said marker objects further comprise markings thereon that yield identification information to said detector.

12. The system of claim 1 wherein said marker objects further comprise markings thereon that yield orientation information to said detector.

13. A method of room planning and design, comprising:
    obtaining a virtual room space comprising a virtual representation of a physical room space;
    loading an object library comprising virtual objects;
    selecting an virtual object;
    receiving positioning information from a user through a workspace comprising a physical model of said physical room space;
    positioning said virtual object in said virtual room space in accordance with said positioning information; and
    wherein said receiving of positioning information from a workspace comprises receiving from a detector the positioning of marker object manually positioned within said workspace by the user.

14. The method of claim 13 further comprising the step of selecting an active working plane for said positioning of said virtual object.

15. A program storage device, readable by machine, tangible embodying a program of instructions executable by the machine to perform method steps for room planning and design, said method steps comprising:
    obtaining a virtual room space comprising a virtual representation of a physical room space;
    loading an object library comprising virtual objects;
    selecting an virtual object;
    receiving positioning information from a user through a workspace comprising a physical model of said physical room space;
    positioning said virtual object in said virtual room space in accordance with said positioning information; and
    wherein said receiving of positioning information from a workspace comprises receiving from a detector the positioning of marker object manually positioned within said workspace by the user.

16. The apparatus of claim 15 further comprising the step of selecting an active working plane for said positioning of said virtual object.

* * * * *